United States Patent [19]

Etoh

[11] Patent Number: 4,829,438

[45] Date of Patent: May 9, 1989

[54] SYSTEM AND METHOD FOR AUTOMATICALLY RUNNING A VEHICLE AT A CRUSING SPEED

[75] Inventor: Yoshiyuki Etoh, Yokohama, Japan

[73] Assignee: Nissan Motor Company, Limited, Yokohama, Japan

[21] Appl. No.: 57,086

[22] Filed: Jun. 3, 1987

[30] Foreign Application Priority Data

Jun. 3, 1986 [JP] Japan .................................. 61-127163

[51] Int. Cl.[4] ............................................. B60K 31/00
[52] U.S. Cl. ........................... 364/426.04; 364/431.07; 180/179; 123/352
[58] Field of Search ....................... 364/426.04, 431.07; 180/175, 176, 179; 123/352, 360, 361, 376

[56] References Cited

U.S. PATENT DOCUMENTS

| | | | |
|---|---|---|---|
| 3,766,367 | 10/1973 | Sumiyoshi et al. .................. | 180/176 |
| 4,467,428 | 8/1984 | Caldwell ......................... | 364/431.07 |
| 4,506,752 | 3/1985 | Hara et al. ........................... | 180/179 |
| 4,660,672 | 4/1987 | Katou ................................... | 180/175 |
| 4,698,762 | 10/1987 | Moriya et al. ........................ | 180/179 |
| 4,729,104 | 3/1988 | Hara ..................................... | 123/352 |

*Primary Examiner*—Gary Chin
*Attorney, Agent, or Firm*—Foley & Lardner, Schwartz, Jeffery, Schwaab, Mack, Blumenthal & Evans

[57] ABSTRACT

A system and method for automatically running a vehicle at a desired cruising speed in which in order to properly control an opening angle of a throttle valve of a vehicular engine, the opening angle of the throttle valve is feedforward controlled. In the feedforward control, a wheel force of the vehicle is derived by storing an instantaneous angular displacement of the throttle valve for each period of controlling the angular displacement of the throttle valve, weighting transient characteristics of a transmission torque in a power train of the vehicle including dead times and first order lag to the stored instantaneous angular displacement of the throttle valve to derive each wheel force for the period of controlling the angular displacement of the throttle valve, and averaging each wheel force for each period of deriving a change rate of the vehicle speed to derive the wheel force. The wheel force is used to derive a running resistance of the vehicle based on deriving a target angular displacement of the throttle valve to maintain the vehicle speed at the cruising speed.

16 Claims, 3 Drawing Sheets

SYSTEM AND METHOD FOR AUTOMATICALLY RUNNING A VEHICLE AT A CRUSING SPEED

BACKGROUND OF THE INVENTION

The present invention relates to a system and method for automatically running a vehicle at a cruising speed.

Japanese Patent Application First Publications Sho Nos. 47-35692, Sho 56-99518, Sho 60-71341, and Sho 60-50031 and Japanese Patent Application Second Publication Sho No. 53-7592 exemplify vehicle cruising speed running systems.

In systems as disclosed in the above-identified Japanese Patent Application publications, a set switch is provided for setting a vehicle speed to a desired cruising speed when turned on. When the set switch is operated, a vehicle speed adjusting mechanism associated with a throttle valve of an engine mounted in a vehicle is actuated to adjust an angular displacement of the throttle valve so that the vehicle speed matches with a set cruising speed.

In addition, when a brake pedal or clutch pedal is operated, a control to maintain the vehicle speed at the set cruising speed is released and the vehicle speed is thereafter reduced. On the other hand, a system as described above includes a resume switch. When the resume switch is operated, the system automatically returns the vehicle speed to the set cruising speed before the operation of such a pedal as described above (resume function) at a constant acceleration. Furthermore, an acceleration switch is provided for setting the vehicle speed at a constant acceleration when turned on. When the acceleration switch is turned on, the constant acceleration of the vehicle is started in which the opening angle of the throttle valve is adjusted so that the actual acceleration of the vehicle accords with the set acceleration. Thereafter, when the acceleration switch is turned off, the vehicle cruising speed control is started in which the vehicle speed is adjusted to reach a target vehicle speed which is the vehicle speed at the time of an off operation of the acceleration switch. When the actual acceleration exceeds the set acceleration during the transfer of control from the constant acceleration to the cruising speed, a gain of vehicle speed control is corrected so as to prevent an overshoot of the vehicle speed.

Among these Japanese Patent Application Publications, for example, in the Japanese Patent Application First Publication Sho No. 47-35692, the vehicle cruising speed running system calculates an error $\epsilon_I (= V_s - V)$ between the vehicle speed $V$ and a target vehicle speed $V_s$ for each predetermined period (, e.g., 300 msec.) and an error $\epsilon_p (= V(t-\Delta t) - V(t))$ between the present vehicle speed $V(t)$ and a previous vehicle speed $V(t-\Delta t)$ before the predetermined period $\Delta t$. In addition, a change rate $\Delta \theta$ of an opening angle through which the throttle valve is angularly displaced is calculated as follows:

$$\Delta\theta = K_I \cdot \epsilon_I + K_p \cdot \epsilon_p \tag{1}$$

However, in systems disclosed in the above-identified Japanese Patent Application publications, the change rate $\Delta\theta$ described above is neither rested on a change in a running resistance of a vehicle during the vehicle run on a road having a gradient nor a vehicle weight. In addition, the system merely operates to displace the throttle valve in an open direction by $\Delta\theta$ for each predetermined period of time when the change rate $\Delta\theta$ derived from the above equation (1) indicates positive and operates to displace the throttle valve in a close direction by $\Delta\theta$ for each predetermined period of time when the change rate $\Delta\theta$ indicates negative. Therefore, since the system cannot determine each predetermined period at which vehicle speed a value of the opening angle of the throttle valve thus determined is settled, the opening angle of the throttle valve is unnecessarily varied when the vehicle runs on a rugged road. Consequently, the vehicle driver feels an ride.

To eliminate such an unpleasant feeling, the Applicant has proposed such a vehicle cruising running system in which a running resistance of the vehicle is estimated and the throttle valve is feedforward controlled on the basis of the estimated running resistance.

An algorithm which estimates the running resistance and proposed by the Applicant is as follows.

STEP 1: A throttle opening angle $\theta$ and engine torque $T_e$ corresponding to the engine speed are read from an engine performance curve.

STEP 2: A wheel force $F_W$ is calculated from the following equation.

$$F_W = \gamma m \cdot \eta m \cdot \gamma n \cdot \eta n \cdot T_e / R \tag{2}$$

STEP 3: An acceleration $\alpha$ of the vehicle is calculated from the following equation.

$$\alpha = \{V(t-\Delta t) - V(t)\}/\Delta t \tag{3}$$

STEP 4: The estimated running resistance D is calculated from the equations (1) and (2) as follows:

$$\tilde{D} = F_W - W \times \alpha / g \tag{4}$$

In the equations (2) and (3), $\gamma m$: gear ratio of each stage of a transmission, $\eta m$: transmission efficiency of each stage of the transmission, $\gamma n$: final reduction gear ratio, $\eta n$: final transmission efficiency, R: radius of tire, W: vehicle weight, and g: gravitational acceleration.

However, since a dead time and lag element are generally present in a transient response of a wheel force $F_W$ with respect to a stepwise angular change of the throttle valve, an error occurs in the calculation of the wheel force $F_W$ this error is due to the presence of the dead time and lag elements in the situation where the opening angle $\theta$ of the throttle valve needs to be largely changed for each control period when the vehicle runs on a rugged road. Consequently, a value of the estimated running resistance $\tilde{D}$ calculated in accordance with the equation (3) is diverged from a true value, therefore a target opening angle of the throttle valve is erroneous, and thus the opening angle value of the throttle valve cannot properly be controlled.

SUMMARY OF THE INVENTION

With the above-described problem in mind, it is an object of the present invention to provide a system and method for automatically running the vehicle at a cruising speed which can achieve an accurate estimated running resistance value even if a transient response of a transmission force in a power train of the vehicle to a stepwise change in the opening angle of the throttle valve includes the dead time and lag elements.

It is another object of the present invention to provide the system and method for automatically running the vehicle at the cruising speed in which the opening angle of the throttle valve can properly be controlled to match an accurately derived target value thereof even when the vehicle runs on the rugged road.

The above-described objects can be achieved by providing a system for automatically running a vehicle at a desired cruising speed, comprising: (a) first means for deriving a vehicle speed; (b) second means for deriving a change rate of the vehicle speed for each first predetermined period of time; (c) third means capable of setting a desired cruising speed; (d) fourth means for deriving an instantaneous angular displacement of a throttle valve installed in a vehicular engine, the instantaneous angular displacement thereof determining the vehicle speed; (e) fifth means for deriving a transient characteristic of a transmission torque of a power train in the vehicle with respect to a change in the instantaneous angular displacement of the throttle valve for each second predetermined period; (f) sixth means for deriving a wheel force of the vehicle on the basis of an average wheel force for each first predetermined period derived on the basis of the transient characteristic of the transmission torque by the fifth means for each second predetermined period and estimating a running resistance of the vehicle on the basis of the change rate of the vehicle speed derived by the second means and wheel force; (g) seventh means for deriving a target angular displacement of the throttle valve to maintain the vehicle speed at the cruising speed set by the third means on the basis of the estimated running resistance derived by the sixth means; (h) eighth means for producing and outputting a vehicle speed control command to maintain the vehicle speed at the cruising speed on the basis of an error between the vehicle speed and cruising speed, change rate of the vehicle speed, and error between the instantaneous angular displacement and target angular displacement of the throttle valve; and (i) ninth means responsive to the vehicle speed control command for actuating the throttle valve to displace the throttle valve toward the target angular displacement.

The above-described objects can also be achieved by providing a system for automatically running a vehicle at a cruising speed, comprising: (a) first means for deriving a vehicle speed; (b) second means for deriving a vehicle acceleration; (c) third means capable of setting a desired target vehicle speed; (d) fourth means for deriving an angular displacement of a throttle valve installed in a vehicular engine by which the vehicle speed is adjusted; (e) fifth means for deriving an engine revolution speed; (f) sixth means for storing the angular displacement of the throttle valve for each predetermined period of control; (g) seventh means for deriving a transient characteristic of a transmission torque of a power train in the vehicle with respect to a stepwise change in the angular displacement of the throttle valve for each predetermined period of control and engine revolution speed derived by the fifth means; (h) eight means for estimating a running resistance of the vehicle on the basis of the acceleration derived by the second means, the angular displacement of the throttle valve for each predetermined period of control, the transient characteristic derived by the seventh means, the engine revolution speed derived by the fifth means, and a selected transmission gear ratio of a transmission in the vehicle; (i) ninth means for calculating a target angular displacement of the throttle valve to maintain the vehicle speed at the target vehicle speed set by the third means under the estimated running resistance derived by the eighth means; and (j) tenth means for producing a speed control command to maintain the vehicle speed at the target vehicle speed according to the vehicle speed, target vehicle speed, acceleration, throttle valve angular displacement and target angular displacement of the throttle valve and actuating the throttle valve to angularly displace toward the target angular displacement in response to the speed control command.

The above-described objects can also be achieved by providing a method for automatically running a vehicle at a desired cruising speed, comprising the steps of: (a) deriving a vehicle speed; (b) deriving a change rate of the vehicle speed for each first predetermined period of time; (c) determining whether a desired cruising speed is set; (d) deriving an instantaneous angular displacement of a throttle valve installed in a vehicular engine, the instantaneous angular displacement thereof determining the vehicle speed; (e) deriving a transient characteristic of a transmission torque of a power train in the vehicle with respect to a stepwise change in the instantaneous angular displacement of the throttle valve for each second predetermined period when determining that the desired cruising speed is set in the step (c); (f) deriving a wheel force of the vehicle on the basis of an average wheel force for each first predetermined period, the averaging wheel force being derived on the basis of the transient characteristic of the transmission torque for each second predetermined period in the step (e); (g) estimating a running resistance of the vehicle against a road on the basis of the change rate of the vehicle speed derived by the step (b) and wheel force derived in the step (f); (h) determining a target angular displacement of the throttle valve to maintain the vehicle speed at the set cruising speed on the basis of the running resistance estimated in the step (g); and (i) outputting a vehicle speed control command to maintain the vehicle speed at the set cruising speed on the basis of the vehicle speed derived in the step (a), change rate in the vehicle speed derived in step (b), instantaneous angular displacement derived in the step (d), and target angular displacement determined in the step (h).

DETAILED DESCRIPTION OF THE PREFERRED EMBODIMENT

Reference will hereinafter be made to the drawings in order to facilitate understanding of the present invention.

Figure 1:
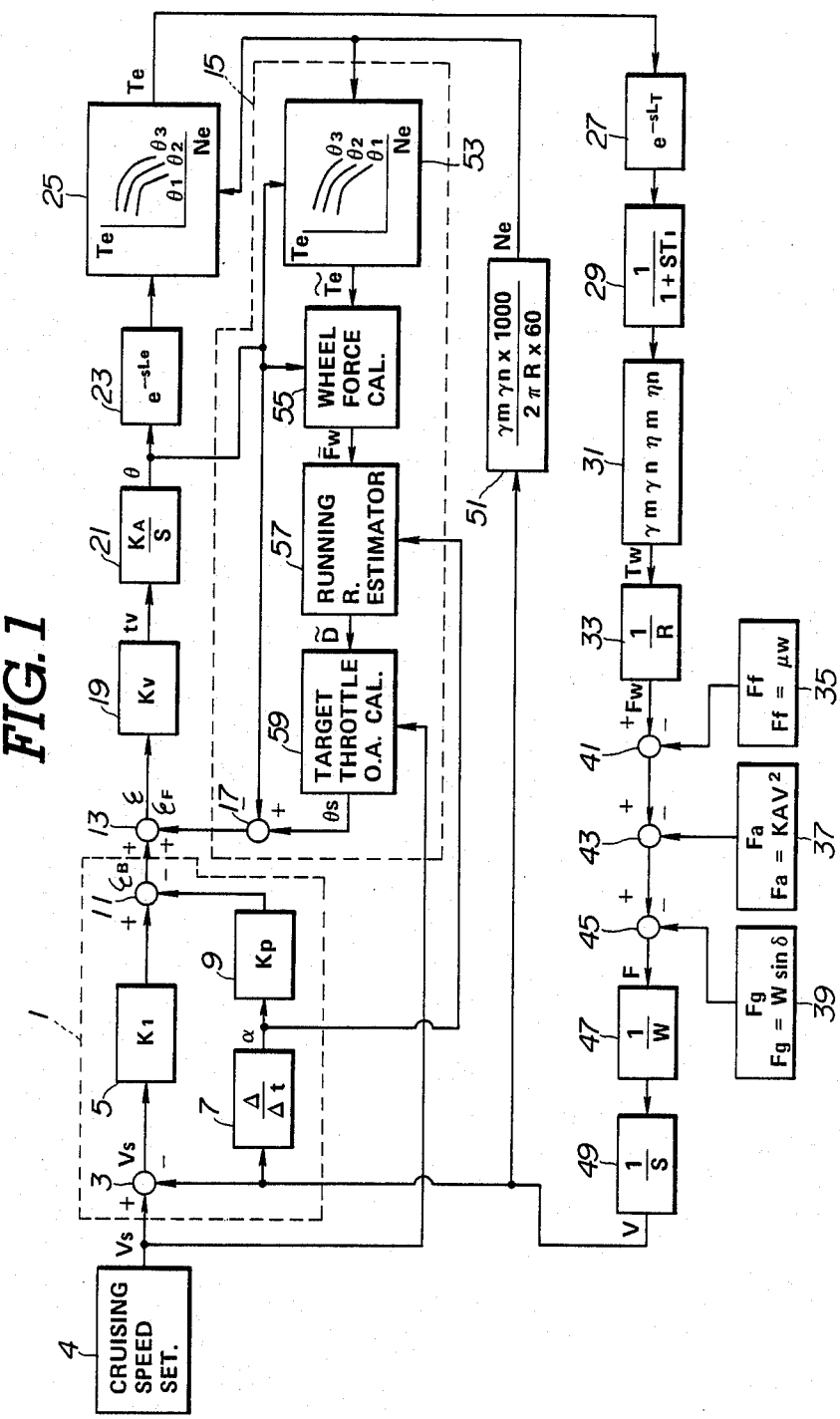
FIG. 1 is a circuit block diagram of a system for automatically running a vehicle at a cruising speed in a first preferred embodiment according to the present invention.
Figure 2:
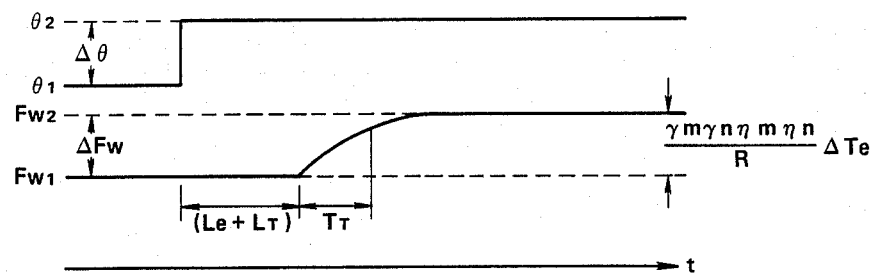
FIG. 2 is an explanatory view of a response waveform of a wheel force corresponding to a stepwise change in an opening angle of a throttle valve.

FIG. 1 shows a construction of an automatically vehicle running system in a preferred embodiment.

It is noted that for simplification purposes, a vehicle in which the system shown in FIG. 1 is mounted is a manual transmission vehicle.

In FIG. 1, a feedback error calculation block 1 includes a subtractor 3, multiplier 5, differentiator 7, another multiplier 9, and another subtractor 11. The subtractor 3 calculates the subtraction ($V_s-V$) of a vehicle speed V derived by an integrator 49 to be described later from a target vehicle speed $V_s$ derived from a target vehicle speed setting device 4 and outputs a signal indicative thereof. The target vehicle speed setting device 4 is associated with a set switch for setting the vehicle speed to a desired cruising speed when turned on by a driver. The multiplier 5 multiplies the value of $V_s-V$ derived from the subtractor 11 by an integration constant $K_I$ and outputs a signal indicative of $K_I \times (V_s-V)$. The differentiator 7 calculates an acceleration $\alpha$ expressed below from the present vehicle speed V(t) and the vehicle speed V(t−Δt) before the predetermined period (Δt) and outputs a signal indicative of the acceleration expressed as follows.

$$\alpha = \{V(t-\Delta t) - V(t)\}/\Delta t \tag{5}$$

The multiplier 9 multiplies a proportional constant $K_p$ by the acceleration $\alpha$ derived from the differentiator 7. The subtractor 11 outputs a feedback error $\epsilon_B$ expressed below.

$$\epsilon_B = K_I \times (V_s - V) - K_p \times \alpha \tag{6}$$

An adder 13 receiving the output signal from the subtractor 11 adds the feedback error $\epsilon_B$ to a feedforward error $\epsilon_F$ from a subtractor 17 in a feedforward error calculation block 15 and outputs a signal indicative of a total error $\epsilon$ expressed as follows.

$$\epsilon = \epsilon_B + \epsilon_F \tag{7}$$

A multiplier 19 receiving the output signal of the adder 13 outputs a signal indicative of an open-and-close duration of time $t_V$ expressed below of a valve within a throttle actuator of a diaphragm type to be described below.

$$t_V = K_V \times \epsilon \tag{8}$$

The diaphragm type throttle actuator includes a vacuum valve for reducing an inner pressure of the actuator when turned on toward a negative pressure and a vent value for increasing the inner pressure when turned on toward the atmospheric pressure. The detailed construction of the diaphragm type throttle actuator is exemplified by two United States patent applications No. 043,468 and Ser. No. 043,532, both filed on Apr. 28, 1987 entitled "A SYSTEM AND METHOD FOR AUTOMATICALLY CONTROLLING A VEHICLE SPEED TO A DESIRED CRUISING SPEED" in the name of Kouichi Suzuki et al. The disclosure of the above-identified United States patent applications are hereby incorporated by reference. The throttle valve is linked with a diaphragm of the throttle actuator. When the vacuum valve is opened, the diaphragm strokes so that the throttle valve is displaced in the open direction.

A throttle valve actuator characteristic discriminator 21 receiving the output signal of the multiplier 19 operates in the way described below. When the open duration $t_V$ of the throttle valve is positive, the vacuum valve is opened for the open duration $t_V$ to actuate the throttle valve in the open direction. When the open duration $t_V$ of the throttle valve is negative, the vacuum valve is closed and vent valve is opened for the duration expressed as $|t_V|$ to actuate the throttle valve in the close direction. The opening angle $\theta$ of the throttle valve is expressed in the following equation.

$$\theta = K_A \cdot t_V/S \tag{9}$$

wherein $K_A$ denotes a gain constant determined by an actuator characteristic such as opening areas of the vacuum valve and vent valve.

Numerals 23 to 51 denote a vehicle mathematical model in which the system in the preferred embodiment is. Numeral 23 denotes a dead time element ($L_e$) of generation of engine torque with respect to the stepwise change in the opening angle of the throttle valve. Numeral 25 denotes an engine performance table by use of which an engine torque $T_e$ is outputted from the opening angle $\theta$ of the throttle valve and engine revolution speed $N_e$. Numerals 27 and 29 denote a dead time element ($L_T$) and a first order lag (time constant $T_I$) when the engine torque $T_e$ is transmitted as a wheel torque $T_W$ of a power train transmission torque. The multiplier 31 having a gain constant expressed as $\gamma m \times \eta m \times \gamma n \times \eta n$ (wherein, $\gamma m$ is the transmission ratio of each stage of the transmission, $\eta m$ is the transmission efficiency of each stage of the transmission, $\gamma n$ is the final reduction gear ratio, $\eta n$ is the final transmission ratio) outputs the wheel torque $T_W$ with respect to the engine torque $T_e$ in a steady state. A multiplier 33 receiving the output signal of the multiplier 31 multiplies the wheel torque $T_W$ by an inverted number of a tire radius R and outputs a signal indicative of a wheel force $F_W$.

When the throttle valve opening angle is changed by $\Delta\theta$ from an angle $\theta_1$ to an angle $\theta_2$ $(=\theta_1+\Delta\theta)$, the engine torque $T_e$ is changed by $\Delta T_e$ from $T_{e1}$ to $T_{e2}$ $(=T_{e1}+\Delta T_e)$ through a table look up of the engine performance table 25. When the wheel force $F_W$ is changed from $F_{w1}$ to $F_{w2}$ $(=F_W+\Delta F_W)$ by $\Delta F_W$, the following equation is established.

$$\Delta F_W = \{e^{-s(L_e+L_T)}/(1+ST_I)\} \times (\gamma m \times \eta m \times \gamma n \times \eta n / R) \Delta T_e \quad (10)$$

It is noted that the dead time $L_e$ of the engine torque generation with respect to the stepwise change of the throttle valve in the above-identified equation (10), the dead time $L_T$ at the time of transmission of the engine torque $T_e$ to the wheel torque $T_W$, and first-order lag $(T_I)$ are different dependently upon the engine characteristic, power train characteristic, and running speed. In this case, the values thereof can previously be calculated by experiments (for example, $L_e$ is approximately 50 msec., $L_T$ is approximately 300 msec., and $T_I$ is approximately 700 msec.). Numerals 35, 37 and 39 denote calculators of a rolling resistance $F_f$, air resistance $F_a$, and gradient resistance $F_g$ of the vehicle, respectively. These resistances can be expressed as follows:

$$F_f = \mu W \quad (11)$$

$$F_a = KAV^2 \quad (12)$$

$$F_g = W\sin\delta \quad (13)$$

wherein $\mu$: rolling resistance coefficient, W: vehicle weight, K: air resistance coefficient, A: front surface projected area, $\delta$: road gradient.

Each value of the rolling resistance $F_f$, air resistance $F_a$, and gradient resistance $F_g$ is inputted to subtractors 41, 43 and 45. Consequently, a driving force applied to the vehicle is derived in the following equation.

$$F = F_W - (F_f + F_a + F_g) \quad (14)$$

Furthermore, a multiplier 47 receives the output signal of the subtractor 45 and calculates a multiplication of an inverted number of the vehicle weight W by a driving force F to derive the acceleration $F \times 1/W$. Then, an integrator 49 integrates the acceleration derived by the multiplier 47. Therefore, the vehicle speed V is derived from the integrator 49. A multiplier 51 multiplies the vehicle speed V from the integrator 49 by $\gamma m \times \gamma n \times 1000/2\pi R \times 60$ to derive the engine revolution speed $N_e$.

The feedforward error calculation block 15 includes an engine performance table 53 which is the same as that designated by numeral 25, wheel force calculation block 55, running resistance estimator 57, a target throttle opening angle calculator 59 as calculation means, and subtractor 17. The wheel force calculator 55 and running resistance estimator 57 constitute estimating means for estimating the running resistance.

The engine performance table 53 outputs the estimated engine torque $\widetilde{T}_e$ at the time of steady state from the throttle opening angle $\theta$ and engine revolution speed $N_e$. The wheel force calculator 55 calculates the estimated wheel force $\widetilde{F}_W$ from the opening angle of the throttle valve $\theta$ and estimated engine torque $\widetilde{T}_e$ for each control period and outputs a signal indicative of the estimated wheel force $\widetilde{F}_W$. The running resistance estimator 57 calculates the estimated running resistance $\widetilde{D}$ of the vehicle from the estimated wheel force $\widetilde{F}_W$ and vehicle acceleration $\alpha$ and outputs the estimated running resistance $\widetilde{D}$ to the target throttle valve opening angle calculator 59. The target throttle valve opening angle calculator 59 produces a signal indicative of a target throttle valve angle $\theta_s$ to continue to run at the target vehicle speed $V_s$ on the basis of the estimated running resistance derived by the estimator 57. The subtractor 17 receives the output signal from the target throttle valve opening angle calculator 59, subtracts the actual throttle valve opening angle $\theta$ from the throttle valve opening angle $\theta_s$, and outputs the result of subtraction $(\theta_s - \theta)$ to an adder 13 as a feedforward error $\gamma_F$.

Next, operations of the wheel force calculator 55 and running resistance estimator 57, both constituting running resistance estimating means, will be described with reference to FIGS. 3 and 4.

Figure 3:
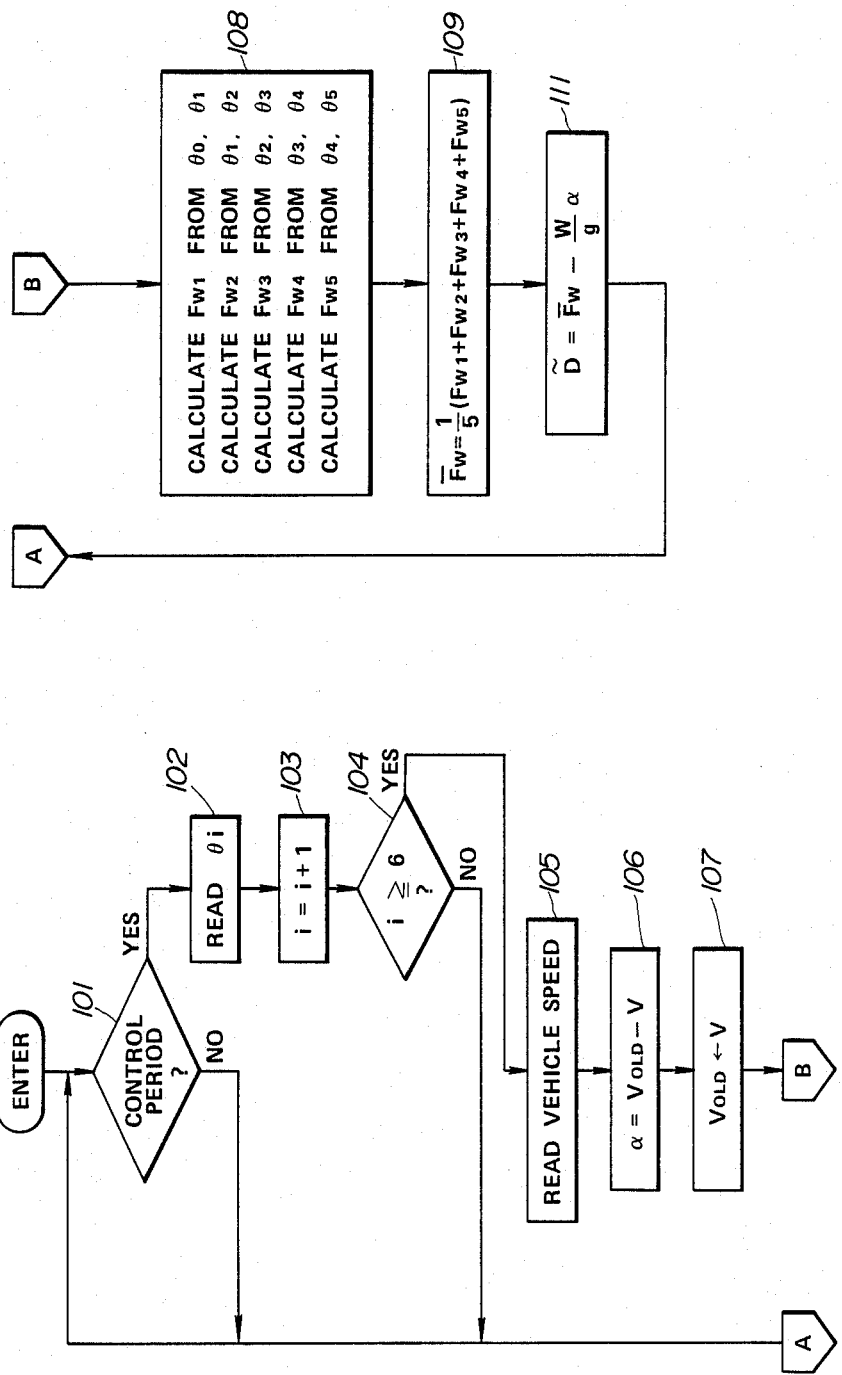
FIG. 3 is an operational flowchart on which means for estimating a running resistance of the vehicle in the system shown in FIG. 1 is executed.

In an operational flowchart shown in FIG. 3, the routine goes to a step 101 in which the estimating means determines whether the control period for the throttle valve has elapsed. If the control period has elapsed (Yes), the routine goes to a step 102 in which the estimating means inputs and stores a newly changed throttle valve opening angle $\theta_i$ (i=0, 1, 2, ..., 5). It is noted that the throttle control period is selected approximately to 200 msec. as shown in FIG. 4. Next, the routine goes to a step 103 in which a counter for counting the number of times the above-described period has elapsed is incremented by one $(i=i+1)$. Then, in a step 104, the estimating means determines whether i is equal to or greater than six $(i \geq 6)$. If $i<6$, the routine returns again to the step 101 to continue the receipt of the throttle valve opening angle value $\theta$. On the other hand, if $i \geq 6$ (Yes) in the step 104, i.e., the differentiation period (corresponds to 1 second) for which the acceleration $\alpha$ is derived from the differentiation in the vehicle speed V has elapsed, the routine goes to a step 105 in which the present vehicle speed is inputted.

In the next step 106, a vehicle speed $V_{OLD}$ before the subtraction period is fetched from the memory and then acceleration $\alpha$ is calculated in the following equation. In a step 107, the vehicle speed $V_{OLD}$ is stored as the current vehicle speed $(V_{OLD} \leftarrow V)$.

$$\alpha = V_{OLD} - V \quad (15)$$

Figure 4:
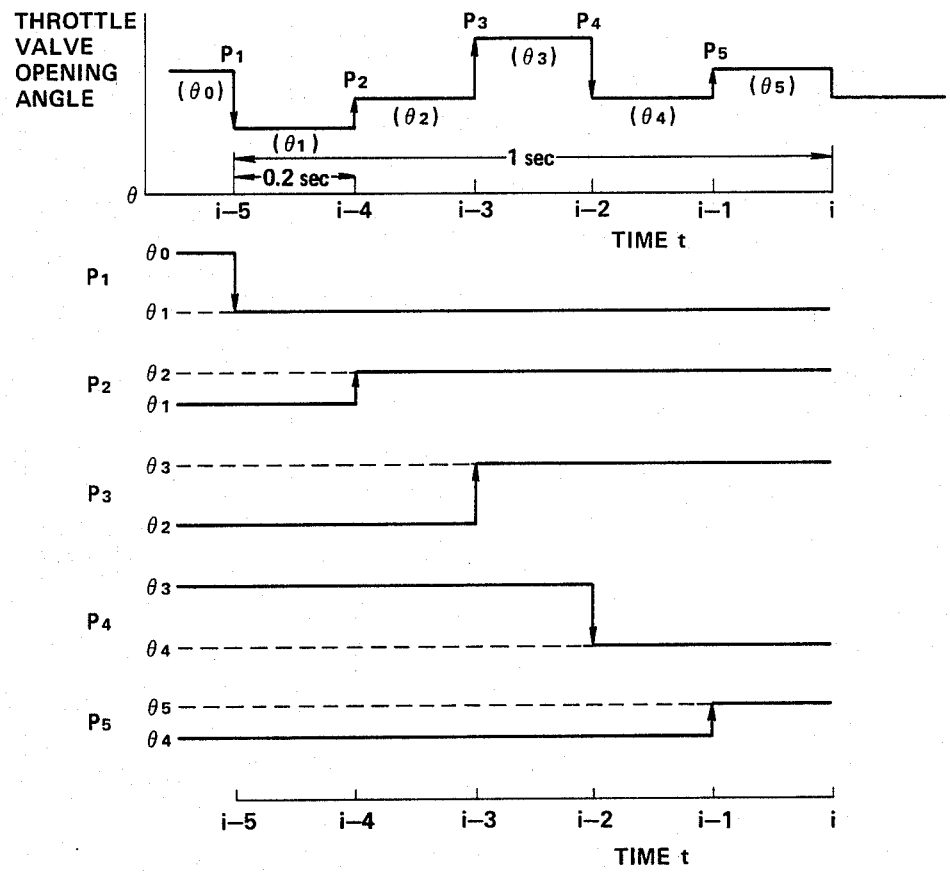
FIG. 4 is an explanatory view of an operation of running resistance estimating means.

In the next step 108, the wheel force $F_{W1}$ is calculated from the equation (10) in a case when there is a stepwise change of the throttle valve opening angle from $\theta_0$ to $\theta_1$ at a time t $(=i-5)$ as shown in P1 of FIG. 4. If there is a stepwise change of the throttle valve from $\theta_1$ to $\theta_2$ at the time t $(t=i-4)$ as shown in P2 of FIG. 4, the wheel force $F_{W2}$ at the time $t=i$ is calculated from the equation (10) in the same way as that for $F_{W1}$. In the same way as described above, the respective wheel forces $F_{W3}$, $F_{W4}$ and $F_{W5}$ which correspond to the stepwise changes of $\theta_2 \rightarrow \theta_3$, $\theta_3 \rightarrow \theta_4$, and $\theta_4 \rightarrow \theta_5$ of the respective throttle valve opening angles shown in P3, P4 and P5 of FIG. 4 are calculated from the equation (10). Then the routine goes to a step 109.

In the step 109, an average wheel force $\bar{F}_W$ from the time $i = -5$ to $t = i$ is calculated from the following equation.

$$\bar{F}_W = (F_{W1} + F_{W2} + F_{W3} + F_{W4} + F_{W5})/5 \tag{16}$$

Finally, the routine goes to a step 111 in which the estimated running resistance D is calculated from the following equation using the vehicle acceleration $\alpha$ in the equation (15) and average wheel force $\bar{F}_W$ in the equation N16).

$$D = \bar{F}_W - W \times \alpha/g \tag{17}$$

In this way, when the flow from the step 101 to the step 111 is repeated, the calculation error of the wheel force can be prevented even though the throttle valve opening angle is varied stepwise for each control period. Consequently, the estimated running resistance $\widetilde{D}$ can accurately be derived.

As described hereinabove, the system and method for automatically running the vehicle at the cruising speed according to the present invention store the throttle valve opening angle for each throttle valve opening angle control period when the power train system transmission is calculated, weights such transient characteristics as dead time and lag element previously calculated to the opening angle of the throttle valve for each differentiation period during which the acceleration is derived to calculate respective power train transmission forces, and derives the power train system transmission force from the average value of the respective power train transmission forces, an error occurring until the power train transmission force is calculated in a case when it is necessary to largely change the opening angle of the throttle valve for each control period. Consequently, a proper estimated running resistance value can be derived and appropriate throttle valve control becomes possible.

It will fully be understood by those skilled in the art that the foregoing description is made in terms of the preferred embodiment and various changes and modifications may be made without departing from the scope of the present invention which is to be defined by the appended claims.

What is claimed is:

1. A system for automatically running a vehicle at a desired cruising speed, comprising:
   (a) first means for deriving a vehicle speed;
   (b) second means for deriving a change rate of the vehicle speed for each first predetermined period of time;
   (c) third means through which the vehicle speed at which the vehicle runs is set by a driver as the desired cruising speed;
   (d) fourth means for deriving an instantaneous angular displacement of a throttle valve installed in a vehicular engine
   (e) fifth means for deriving a change of a transmission torque of a power train in the vehicle with respect to a change in the instantaneous angular displacement of the throttle valve for each second predetermined period;
   (f) sixth means for deriving an average wheel force for each first predetermined period derived on the basis of the change of the transmission torque by the fifth means for each second predetermined period and estimating a running resistance of the vehicle on the basis of the change rate of the vehicle speed derived by the second means and said average wheel force;
   (g) seventh means for deriving a target angular displacement of the throttle valve to maintain the vehicle speed at the cruising speed set by the third means on the basis of the estimated running resistance derived by the sixth means;
   (h) eighth means for producing and outputting a vehicle speed control command to maintain the vehicle speed at the cruising speed on the basis of an error between the vehicle speed and cruising speed, said change rate of the vehicle speed, and said error between the instantaneous angular displacement and said target angular displacement of the throttle valve; and
   (i) ninth means responsive to the vehicle speed control command for actuating the throttle valve to displace the throttle valve toward the target angular displacement.

2. The system as set forth in claim 1, which further comprises:
   (j) tenth means for storing the instantaneous angular displacement of the throttle valve for each second predetermined period;
   (k) eleventh means for deriving the change in the instantaneous angular displacement of the throttle valve on the basis of the stored instantaneous angular displacement thereof; and
   (l) twelfth means for deriving an engine revolutional speed in accorance with the vehicle speed derived by said first means.

3. The system as set forth in claim 2, wherein the fifth means derives the change of the transmission torque with respect to the change in the instantaneous angular displacement derived by the eleventh means and the engine revolutional speed derived by the twelfth means.

4. The system as set forth in claim 2, wherein the sixth means comprises:
   (m) thirteenth means for comparing the change of a transmission torque derived by the fifth means to the instantaneous angular displacement of the throttle valve derived by the fourth means for each second predetermined period stored in the tenth means so that the wheel force for each second predetermined period is derived; and
   (n) fourteenth means for averaging the wheel forces for each second predetermined period derived by the thirteenth means in order to derive the wheel force.

5. The system as set forth in claim 4, wherein the wheel force for each second predetermined period is derived from the following equation:

$$\Delta F_W = \{e^{-s(L_e+L_T)}/(1+ST_I)\} \times (\gamma m \times \eta m \times \gamma n \times \eta n / R) \Delta T_e,$$

wherein $L_e$ denotes a dead time of generation of an engine torque with respect to the change in the angular displacement of the throttle valve derived by the eleventh means, $L_T$ and $T_I$ denote a dead time and first order lag when the engine torque is transmitted to the power train as a wheel torque, respectively, S denotes a complex number, $\gamma m$ denotes a gear ratio of a selected shift position of a transmission, $\eta m$ denotes a transmission efficiency, $\gamma n$ denotes a final reduction ratio, $\eta n$ denotes a final transmission efficiency, R denotes a driven tire radius, and $\Delta T_e$ denotes the change in engine torque for each second predetermined period derived by the fifth means.

6. The system as set forth in claim 5, wherein $L_e$, $L_T$, $T_I$ are determined by experiments.

7. The system as set forth in claim 6, wherein $L_e$ is substantially 50 milliseconds, $L_T$ is substantially 300 milliseconds and $T_I$ is substantially 700 milliseconds.

8. The system according to claim 5, wherein the fifth means derives $\Delta T_e$ with an engine performance curve with respect to the engine revolutional speed derived by the twelfth means and the change in the instantaneous angular displacement derived by the eleventh means through a table look up technique.

9. The system according to claim 1, wherein the first predetermined period is substantially one second and five times longer than the second predetermined period.

10. A system for automatically running a vehicle at a cruising speed, comprising:
    (a) first means for deriving a vehicle speed;
    (b) second means for deriving a vehicle acceleration;
    (c) third means through which the vehicle speed at which the vehicle runs is set by a driver as a desired target vehicle speed;
    (d) fourth means for deriving an angular displacement of a throttle valve installed in a vehicular engine by which the vehicle speed is adjusted;
    (e) fifth means for deriving an engine revolution speed;
    (f) sixth means for storing the angular displacement of the throttle valve derived by said fourth means for each predetermined period of control;
    (g) seventh means for deriving a change of a transmission torque of a power train in the vehicle with respect to a stepwise change in the angular displacement of the throttle valve for each predetermined period of control stored in said sixth means and engine revolution speed derived by the fifth means;
    (h) eighth means for estimating a running resistance of the vehicle on the basis of the acceleration derived by the second means, the angular displacement of the throttle valve for each predetermined period of control, the change derived by the seventh means, the engine revolution speed derived by the fifth means, and a selected transmission gear ratio of a transmission in the vehicle;
    (i) ninth means for calculating a target angular displacement of the throttle valve to maintain the vehicle speed at the target vehicle speed set by the third means based on the estimated running resistance derived by the eighth means; and
    (j) tenth means for producing a speed control command to maintain the vehicle speed at the target vehicle speed according to the vehicle speed, said target vehicle speed, said acceleration, said throttle valve angular displacement and said target angular displacement of the throttle valve and actuating the throttle valve to angularly displace toward the target angular displacement in response to the speed control command.

11. The system as set forth in claim 10, wherein the eighth means comprises:
    (a) eleventh means for comparing the change of a transmission torque derived by the seventh means to the angular displacement of the throttle valve for each predetermined period of control stored by the sixth means for each period of derivation of the acceleration by the second means in order to derive each wheel force;
    (b) twelfth means for deriving an average wheel force; and
    (c) thirteenth means for calculating the estimated running resistance on the basis of the derived average wheel force.

12. The system as set forth in claim 2, wherein the thirteenth means calculates the estimated running resistance in the following equation: $D = F_W - W\alpha/g$, wherein $\bar{F}_W$ denotes the average wheel force, W denotes a vehicle weight, $\alpha$ denotes the acceleration, and g denotes a gravitational acceleration.

13. A method for automatically running a vehicle at a desired cruising speed, comprising the steps of:
    (a) deriving a vehicle speed;
    (b) deriving a change rate of the vehicle speed for each first predetermined period of time;
    (c) determining whether said desired cruising speed is set;
    (d) deriving an instantaneous angular displacement of a throttle valve installed in a vehicular engine;
    (e) deriving a change of a transmission torque of a power train in the vehicle with respect to a stepwise change in the instantaneous angular displacement of the throttle valve for each second predetermined period when determining that the desired cruising speed is set in the step (c);
    (f) deriving an average wheel force for each first predetermined period, the averaging wheel force being derived on the basis of the change of the transmission torque for each second predetermined period in the step (e);
    (g) estimating a running resistance of the vehicle against a road on the basis of the change rate of the vehicle speed derived by the step (b) and wheel force derived in the step (f);
    (h) determining a target angular displacement of the throttle valve to maintain the vehicle speed at the set cruising speed on the basis of the running resistance estimated in the step (g); and
    (i) outputting a vehicle speed control command to maintain the vehicle speed at the set cruising speed on the basis of the vehicle speed derived in the step (a), said change rate in the vehicle speed derived in step (b), said instantaneous angular displacement derived in the step (d), and said target angular displacement determined in the step (h).

14. A system for a vehicle, comprising:
(a) first means for deriving a vehicle speed;
(b) second means for deriving a change rate of the vehicle speed with respect to time for each first predetermined period of time;
(c) third means through which the vehicle speed is set by a vehicle driver as a cruise speed at which the driver desires the vehicle to cruise;
(d) fourth means for deriving a current operating variable of an engine driving force adjusting mechanism mounted in the vehicle;
(e) fifth means for deriving a change in the operating variable of the engine driving force adjusting mechanism and for deriving a change of a transmission torque of a power train system of the vehicle from the change of the operating variable for each second predetermined period of time;
(f) sixth means for deriving an average tire wheel force of the vehicle for each first predetermined period of time on the basis of the change of the transmission torque derived by the fifth means and for estimating a running resistance of the vehicle on the basis of the change rate of the vehicle speed and said average tire wheel force;
(g) seventh means for deriving a difference between the vehicle speed and the set cruise speed, a difference between the current operating variable and a current target operating variable, and for deriving a new target operating variable of the engine driving force adjusting mechanism through which the vehicle speed is maintained at the cruise speed set through the third means on the basis of the difference between the vehicle speed and the set cruise speed, said change rate of the vehicle speed with respect to time, and the difference between the current target operating variable and the current operating variable; and
(i) eighth means responsive to a vehicle speed control command to command that the vehicle speed is maintained at the set cruise speed from the third means for actuating the engine driving force adjusting mechanism to adjust the operating variable thereof to the target operating variable.

15. The system as set forth in claim 14, wherein the first means derives the vehicle speed on the basis of the average tire wheel force derived by the sixth means.

16. The system as set forth in claim 14, wherein the operating variable is an opening angle of an engine throttle valve.

* * * * *